(12) United States Patent (10) Patent No.: US 12,555,271 B2
Sakurahara et al. (45) Date of Patent: Feb. 17, 2026

(54) DATA COMPRESSION EQUIPMENT, DATA COMPRESSION METHODS, AND PROGRAMS

(71) Applicant: NTT, Inc., Tokyo (JP)

(72) Inventors: Yusuke Sakurahara, Musashino (JP); Yukihiro Goto, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 132 days.

(21) Appl. No.: 18/292,099

(22) PCT Filed: Aug. 6, 2021

(86) PCT No.: PCT/JP2021/029426
§ 371 (c)(1),
(2) Date: Jan. 25, 2024

(87) PCT Pub. No.: WO2023/013069
PCT Pub. Date: Feb. 9, 2023

(65) Prior Publication Data
US 2024/0346700 A1 Oct. 17, 2024

(51) Int. Cl.
*G06T 9/00* (2006.01)
*G06T 17/00* (2006.01)
(52) U.S. Cl.
CPC .............. *G06T 9/001* (2013.01); *G06T 17/00* (2013.01); *G06T 2210/56* (2013.01)

(58) Field of Classification Search
CPC ..... G06T 9/001; G06T 17/00; G06T 2210/56; G01B 11/24; G01C 15/00
See application file for complete search history.

(56) References Cited

U.S. PATENT DOCUMENTS

| | | | |
|---|---|---|---|
| 2002/0011558 A1* | 1/2002 | Neukermans | H04N 1/00891 250/236 |
| 2017/0113422 A1* | 4/2017 | Maass | B29C 70/386 |
| 2019/0094040 A1* | 3/2019 | Lewis | G01S 17/89 |
| 2020/0410690 A1* | 12/2020 | Zeng | G06V 20/56 |

FOREIGN PATENT DOCUMENTS

JP 2017156179 9/2017

* cited by examiner

*Primary Examiner* — Grace Q Li
(74) *Attorney, Agent, or Firm* — Fish & Richardson P.C.

(57) ABSTRACT

An object of the present invention is to provide a data compression device, a data compression method, and a program capable of thinning out a point group acquired by a three-dimensional (3D) laser scanner without affecting the creation of a 3D model. A data compression device according to the present invention is a data compression device which compresses 3D point group data indicating 3D coordinates of points on a surface of an outdoor structure acquired using a 3D laser scanner while moving including: a point group deleting part which thins out the 3D point group data according to an arbitrary criterion and calculates scan lines deleted through the thinning-out of the 3D point group data; and an extraction processing part which creates a 3D model from the thinned 3D point group data while skipping the deleted scan lines which are stored.

11 Claims, 10 Drawing Sheets

DATA COMPRESSION EQUIPMENT, DATA COMPRESSION METHODS, AND PROGRAMS

CROSS-REFERENCE TO RELATED APPLICATIONS

This application is a National Stage application under 35 U.S.C. § 371 of International Application No. PCT/JP2021/029426, having an International Filing Date of Aug. 6, 2021. The disclosure of the prior application is considered part of the disclosure of this application, and is incorporated by reference in its entirety into this application.

TECHNICAL FIELD

The present disclosure relates to a data compression device, a data compression method, and a program for compressing three-dimensional point group data representing three-dimensional coordinates of points on the surface of an outdoor structure acquired using a three-dimensional laser scanner.

BACKGROUND ART

A technique for three-dimensional modeling of outdoor structures using an in-vehicle three-dimensional laser scanner (mobile mapping system: MMS) has been developed (refer to, for example, PTL 1). FIG. 3 is a diagram for explaining an MMS. The MMS includes a three-dimensional laser scanner 46 as a measuring part, a camera 42 as an imaging part, a global positioning system (GPS) receiver 43, an inertial measurement unit (IMU) 44 as an inertial measurement device, and an odometer 45 as an odometer, a storage medium 47, and an arithmetic device 48.

The MMS performs three-dimensional surveying of the surroundings using the three-dimensional laser scanner 46, the camera 42, the GPS receiver 43, the IMU 44, and the odometer 45 while running and stores each piece of data obtained by this in the storage medium 47 as a point group data storage device. The storage medium 47 is configured of, for example, a hard disk drive (HDD) or a solid state drive (SSD) and stores map data of the management target area in advance. Also, as the camera 42, a camera in which an imaging direction can be arbitrarily changed by a pan/tilt mechanism and an imaging range can be changed by a zoom function is used.

This technique can be performed so that the recall and accuracy of the 3D model are improved even in a state in which the point group is raw (state in which vehicle speed is high) and obtaining good results is possible by creating a point group 10a and a scan line 20a on a space Ar1 in which point groups do not exist as shown in FIG. 1 and then creating a 3D model M10 as shown in FIG. 2.

In FIG. 1, a point group obtained using a three-dimensional laser scanner is denoted by reference numeral 10 and a scan line of the three-dimensional laser scanner is denoted by reference numeral 20. The scan line is a line which connects point groups other than the wall surface and the ground such as a cylindrical object from the point group data with point groups which are close to the GPS time (in one rotation of the laser scanner).

Also, a line showing how points on a scan line correspond to points on other scan lines is denoted by reference numeral 30. The line is a visual line, not a line used for modeling.

CITATION LIST

Patent Literature

[PTL 1] Japanese Patent Application Publication No. 2017-156179

SUMMARY OF INVENTION

Technical Problem

It is desired that the point group acquired using the 3D laser scanner be stored in the database and the facility state can be checked on a PC at a later date without going to the site. However, an MMS does not have a function of changing the number of laser irradiation points depending on a speed state and acquires many point groups when the speed is low. Furthermore, in the related art, some models use not only coordinates but also the time (hereafter referred to as "GPS time") obtained from a satellite positioning system (for example. GPS) to create a 3D model and the point group and GPS time are important. Thus, there is a problem in which it is not possible to appropriately thin out the data, resulting in an enormous amount of data. Furthermore, there also is a problem in which, when the vehicle has a low speed or is stopped, there are points in which different GPS times are held even though the coordinates are the same, and if the points are thinned out as it is, the 3D model cannot be created or the accuracy of the 3D model is low.

Thus, in order to solve the above problems, an object of the present invention is to provide a data compression device, a data compression method, and a program capable of thinning out point groups acquired using a 3D laser scanner without affecting the creation of a 3D model.

Solution to Problem

In order to achieve the above object, the data compression device according to the present invention prevents an influence on creation of a three-dimensional model by leaving information indicating at what time a point group is deleted when the point groups are thinned out.

Specifically, a data compression device according to the present invention is a data compression device which compresses three-dimensional (3D) point group data indicating 3D coordinates of points on a surface of an outdoor structure acquired using a 3D laser scanner while moving including:
 a point group deleting part which thins out the 3D point group data according to an arbitrary criterion and calculates scan lines deleted through the thinning-out of the 3D point group data; and
 an extraction processing part which creates a 3D model from the thinned out 3D point group data while skipping the deleted scan lines which are stored.

A data compression method according to the present invention is a data compression method which compresses three-dimensional (3D) point group data indicating 3D coordinates of points on a surface of an outdoor structure acquired using a 3D laser scanner while moving including:
 thinning out the 3D point group data according to an arbitrary criterion;
 calculating scan lines through the thinning-out of the 3D point group data; and
 creating a 3D model from the thinned out 3D point group data while skipping the deleted scan lines which are stored.

In the related art, although point groups are detected in the order of GPS time from the storage medium at the time of creating a 3D model, if the point groups are thinned out, the point group at the desired GPS time cannot be detected and a 3D model cannot be created or the accuracy of the 3D model is lowered. Since the data compression device and method according to the present invention can ascertain the GPS time of a thinned-out point group, the point group detection is not performed for this time and a point group at a GPS time at which there has been no thinning out is detected as the next data.

Therefore, it is possible to provide a data compression device and a data compression method capable of thinning out the point groups acquired using the three-dimensional laser scanner without affecting the creation of the three-dimensional model.

For example, the arbitrary criterion of the point group deleting part can be a reference determined using the moving speed of the three-dimensional laser scanner.

For example, the arbitrary reference of the point group deleting part may be a reference determined using the type of the outdoor structure.

The present invention includes a program causing a computer to function as the data compression device. The data compression device of the present invention can also be realized by a computer and a program and the program can be recorded on a recording medium or provided over a network.

The above inventions can be combined to any extent possible.

Advantageous Effects of Invention

The present invention can provide a data compression device, a data compression method, and a program capable of thinning out a point group acquired using a 3D laser scanner without affecting creation of a 3D model.

DESCRIPTION OF EMBODIMENTS

Figure 1:
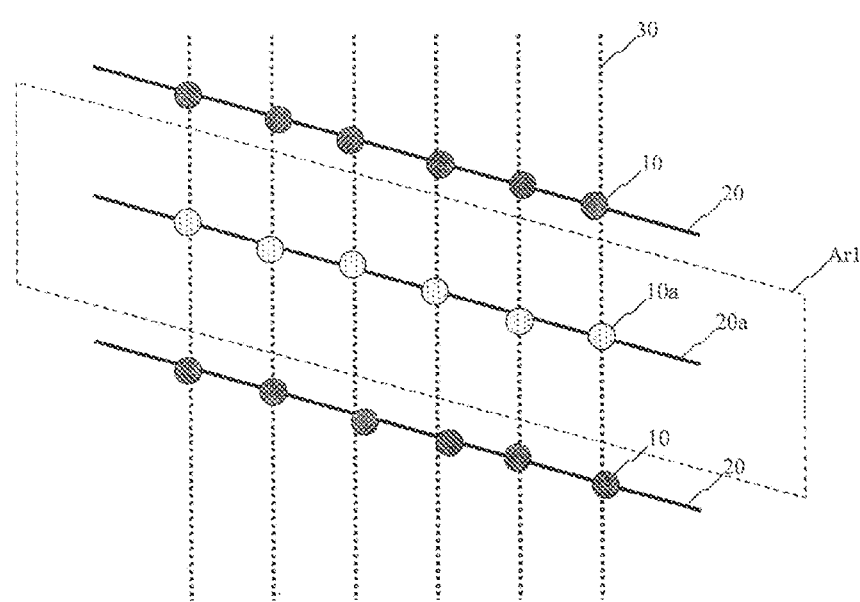
FIG. 1 is a diagram for explaining a point group and scan lines.
Figure 2:
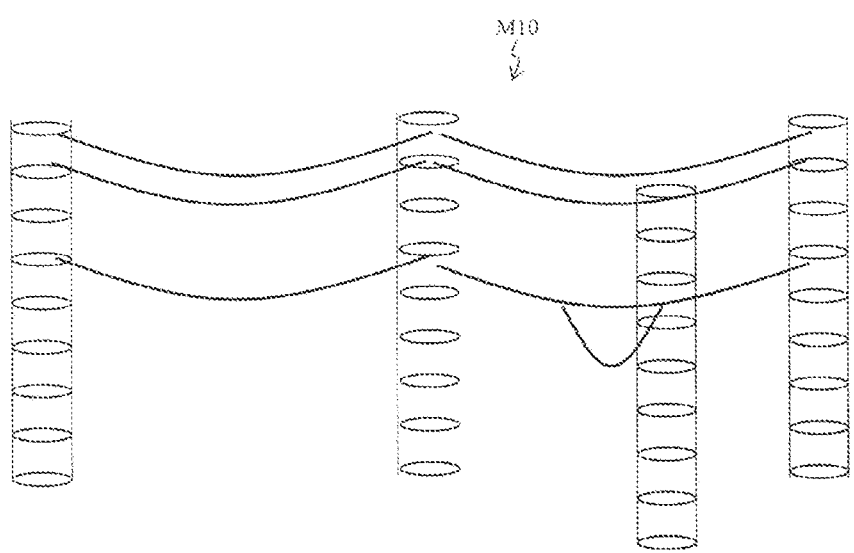
FIG. 2 is a diagram for explaining a three-dimensional model to be created.
Figure 3:
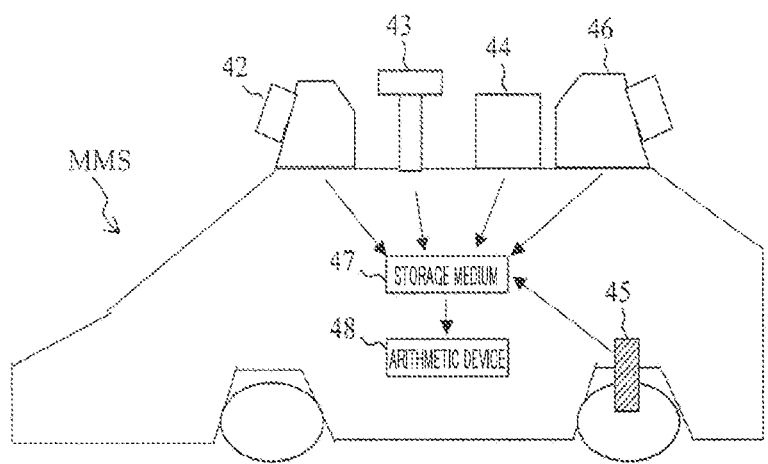
FIG. 3 is a diagram for explaining an MMS.

Embodiments of the present invention will be described with reference to the accompanying drawings. The embodiments which will be described below are examples of the present invention and the present invention is not limited to the following embodiments. Note that, in this specification and the drawings, constituent elements having the same reference numerals are the same as each other.

Embodiment 1

Figure 4:
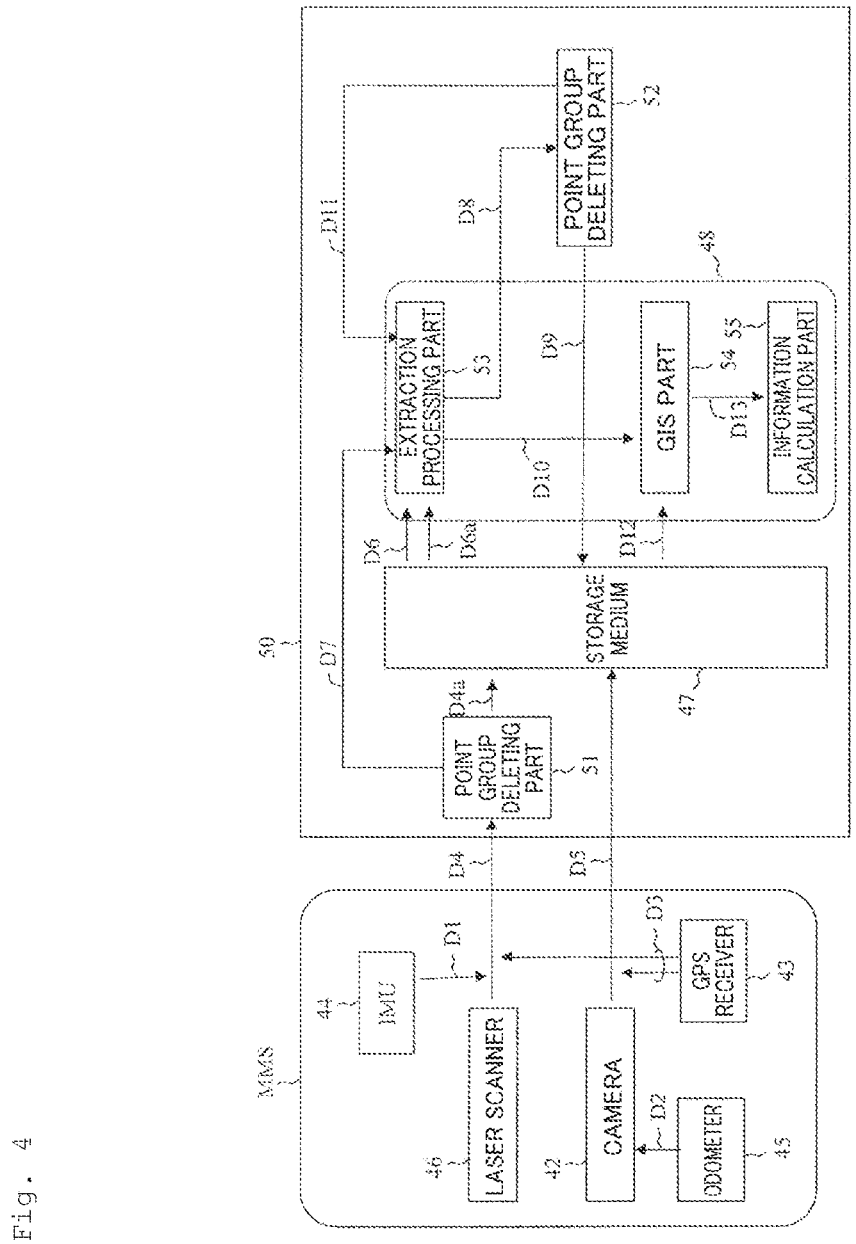
FIG. 4 is a diagram for explaining a data compression device according to the present invention.

FIG. 4 is a diagram for explaining a data compression device 50 of an embodiment. The data compression device 50 is a data compression device which compresses 3D point group data representing the 3D coordinates of points on a surface of an outdoor structure acquired using a 3D laser scanner while moving and includes a point group deleting part (at least one of 51 and 52) which thins out the 3D point group data according to an arbitrary criterion and calculates scan lines deleted by the thinning of the 3D point group data, and an extraction processing part 53 which creates a three-dimensional model from the thinned three-dimensional point group data while skipping the deleted scan lines which are stored.

The MMS divides the data (acceleration data D1, distance D2, position and time D3) acquired using various measuring instruments (IMU 44, laser scanner 46, camera 42, odometer 45, GPS receiver 43) into point group data D4 and image data D5 and inputs them to the data compression device 50. The image data D5 is stored in the storage medium 47 as it is. If the data compression device 50 includes the point group deleting part 51, the point group data D4 is input to the point group deleting part 51. If the data compression device 50 does not include the point group deleting part 51, the point group data D4 is stored in the storage medium 47 as it is.

Figure 5:
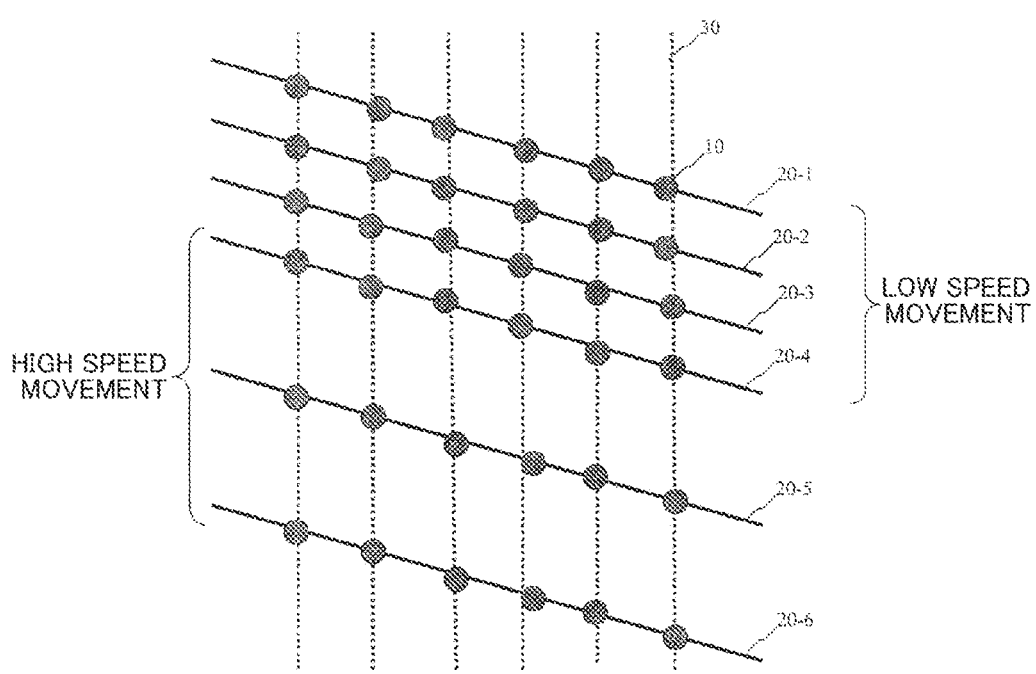
FIG. 5 is a diagram for explaining a concept of point group removal performed by the data compression device according to the present invention.

The point group deleting part 51 deletes unnecessary point groups from the point group data D4 on the basis of arbitrary criteria. Here, the arbitrary reference of the point group deleting part 51 is a reference determined by the moving speed of the three-dimensional laser scanner. FIG. 5 is a diagram for explaining the concept of point group removal performed by the point group deleting part 51.

The point group deleting part 51 calculates the velocity at the time of measurement from the GPS measurement time (any other time can be used as long as the acquisition time of each point can be represented) and the movement distance of MMS and applies the thinning rate for each velocity. For example, as shown in FIG. 5, the point group deleting part 51 deletes many point groups (the point group 10 on the scan lines 20-2 and 20-3) during low speed movement and deletes the point group 10 during high speed movement. It is possible to compress the amount of data while ensuring the accuracy of the model by deleting the point group 10 for each velocity by the point group deleting part 51.

Figure 6:
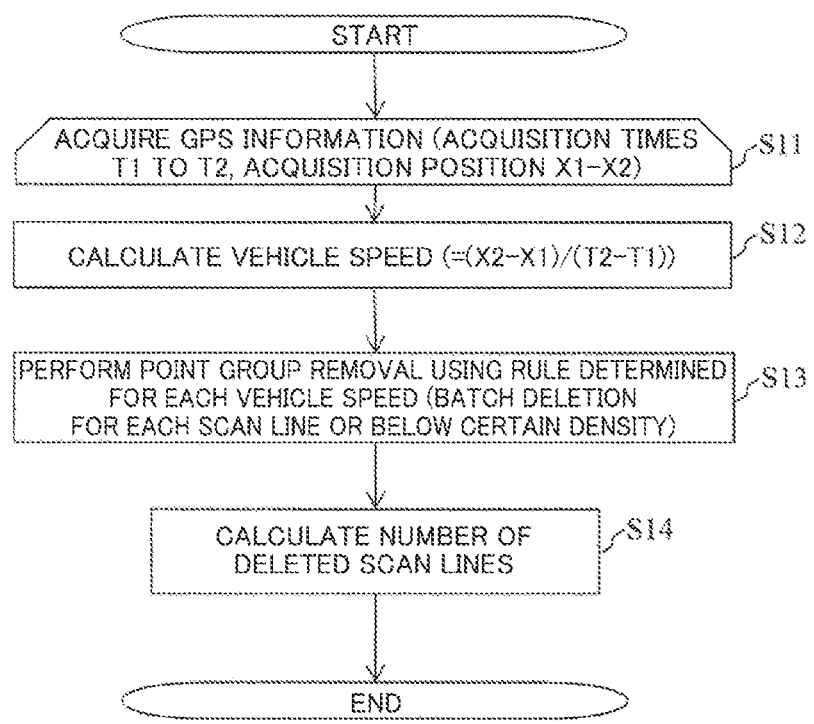
FIG. 6 is a diagram for explaining a data compression method according to the present invention.

FIG. 6 is a flowchart for explaining the point group deleting method performed by the point group deleting part 51. The point group deleting part 51 acquires GPS information included in the point group data D4 (Step S11). The GPS information is the acquisition time (for example, T1, T2) and the acquisition position (for example, X1, X2) at which the point was acquired. The point group deleting part 51 calculates the speed of MMS (Step S12). Specifically, (X2−X1)/(T2−T1) is calculated.

The point group deleting part 51 deletes the point group according to a rule determined for each vehicle speed (Step S13). The following rule is considered as the rule. These rules are combined to delete the point group.

(1) Point Group Deletion Proportional to Vehicle Speed

The maximum speed at which 3D modeling is possible from the point group is calculated and the number of scan lines when traveling at different speeds is adjusted so that the number of scan lines at that time is obtained. If the speed is ½ of the maximum speed, the number of scan lines needs to be reduced to ½, and if the speed is ⅓, the number of scan lines needs to be reduced to ⅓. If the speed is 0, the same location is measured. Thus, they are deleted all at once. For example, it is assumed that traveling at 60 km/or less is required to model a utility pole. When traveling at 30 km/h, the scan lines which can be acquired are double those at 60 km/h. Thus, the scan lines acquired at 30 km/h are cut in half.

(2) Minimum Point Group Density is Maintained

A certain amount of point group is necessary to calculate the deflection value of the cable because accuracy is required. If the point group is deleted too much, the accuracy deteriorates. Thus, the point group is deleted while satisfying the condition (minimum point group density) in which the deflection value equivalent to the deflection value calculated using the related method can be calculated.

(3) Set Point Group Density

The point group is deleted for each scan line (every laser scanner lap) or within the corresponding processing time until the point density reaches a set percentage.

After deleting the point group, the point group deleting part 51 calculates and stores the number of deleted scan lines. The calculated number of scan lines is used in the processing of the extraction processing part 53 which will be described later (data D7). The point group deleting part 51 causes the storage medium 47 to store the deleted point group (thinning point group D4$a$).

As shown in FIG. 4, the point group removal by the point group deleting part 51 is not performed in real time when the point group is acquired, but is performed before saving the point group data in the storage medium 47 after the measurement is completed.

The extraction processing part 53 determines what the object (type of outdoor structure) of the point group data D6 stored in the storage medium 47 is and the point group deleting part 52 is notified of the type of the outdoor structure together with the point group data (data D8). The point group deleting part 52 deletes unnecessary point groups on the basis of arbitrary criteria and stores only the necessary point groups in the storage medium 47 again (thinned point group data D9). Here, the arbitrary criterion of the point group deleting part 52 is a criterion determined using the type of the outdoor structure.

Figure 7:
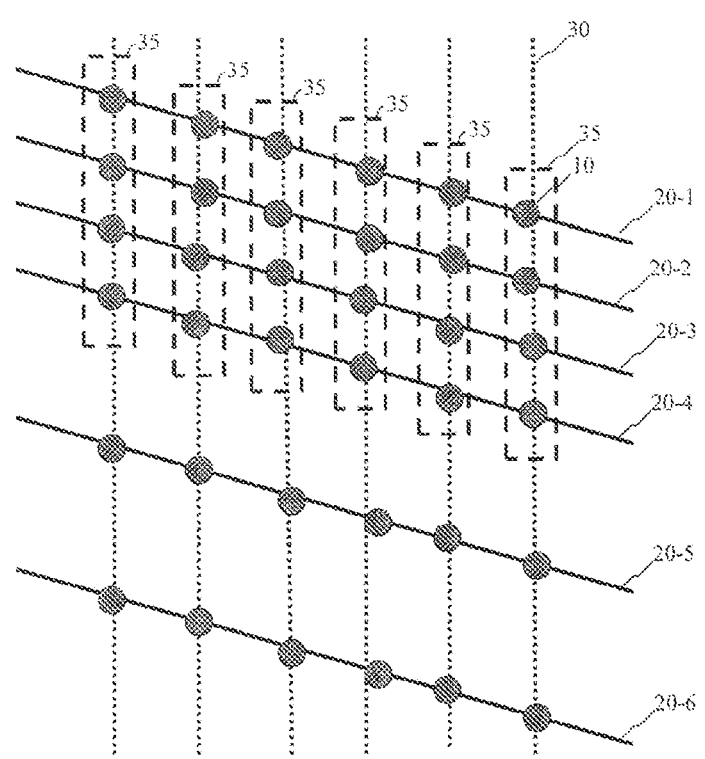
FIG. 7 is a diagram for explaining the concept of point group removal performed by the data compression device according to the present invention.

FIG. 7 is a diagram for explaining the concept of point group removal performed by the point group deleting part 52. Based on the data D8 from the extraction processing part 53, the point group deleting part 52 calculates the density of the point group 10 and deletes the point groups until the required point group density is achieved. For example, as shown in FIG. 7, the point group deleting part 52 assumes a vertically long box 35 whose long axis is parallel to the corresponding line axis 30 and calculates the point group density therein. Also, the point group deleting part 52 deletes points until the point group reaches a desired density. Since a high-density point group is required when calculating facility information regarding a small-diameter facility such as a cable, it is preferable to change the point group density for each facility. It is possible to compress the amount of data while ensuring the accuracy of the model by setting a desired point group density for each target facility by the point group deleting part 52.

Figure 8:
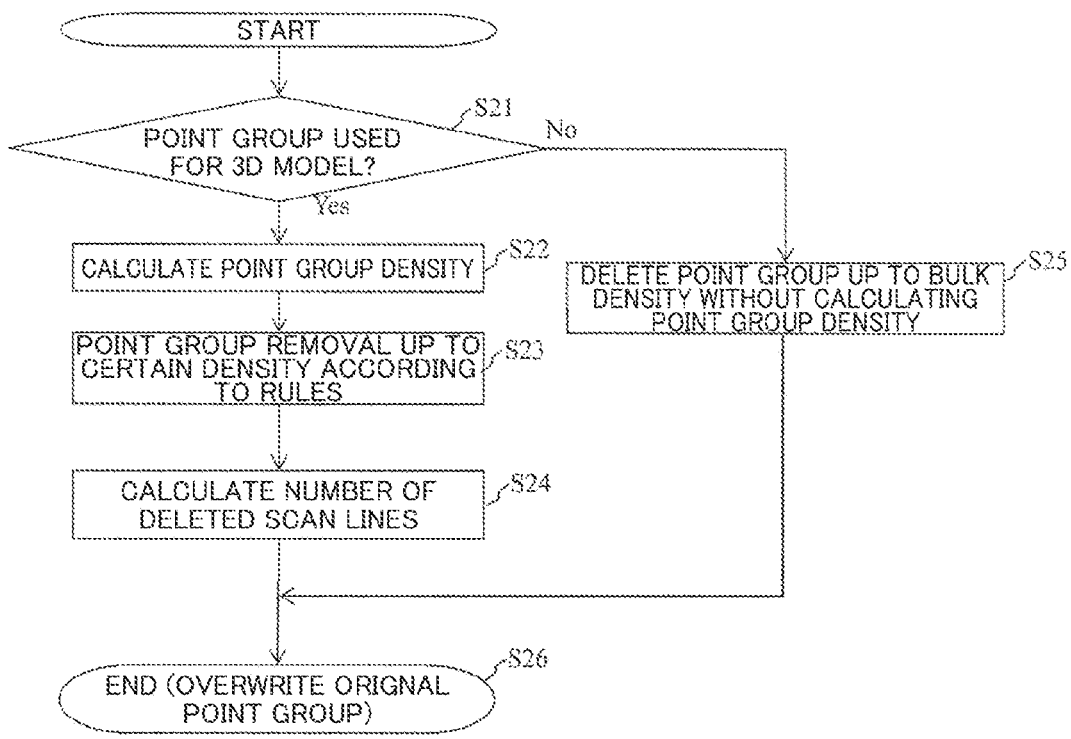
FIG. 8 shows diagrams for explaining a data compression method according to the present invention.

FIG. 8 is a flowchart for explaining the point group removing method performed by the point group deleting part 52. The point group deleting part 52 determines whether the point group data D6 extracted by the extraction processing part 53 is used for creating a three-dimensional model (Step S21). If the point group data D6 is a point group used for creating a three-dimensional model, the point group deleting part 52 calculates the point group density (Step S22).

The point group deleting part 52 deletes point groups up to a certain point group density according to the rule (Step S23). Here, the point group deleting part 52 determines which object the point group data D6 is used for creating a three-dimensional model (utility poles, cables, closures, and the like) of the object, leaves the point group with the point group density required for the object, and deletes the rest. The rule is a point group density defined for each object.

It is possible to determine whether the point group is used for model creation using a facility inspection technique using a point group, such as Patent Literature 1. Specifically, whether it is a wall surface or a cylindrical object can be determined from the shape of the scan line, and if it is a cylindrical object, it is possible to automatically determine whether it is a utility pole, a support, a cable, or the like from the thickness and angle. Here, if it is a utility pole or a support, it is possible to create a model even if the point group density is small, compared with a cable. For this reason, a rule (point group density of cables>point group density of utility poles and supports) is set to increase the point group density of cables and decrease the point group density of utility poles and supports. For example, a rule with a point group density of 100 for cables and a point group density of 50 for utility poles is set. That is to say, the number of points to be deleted is reduced for an object with a small number of point groups which can be obtained, such as a cable, and the number of points to be deleted is increased for an object with a large number of point groups which can be obtained, such as a utility pole.

After deleting the point group, the point group deleting part 52 calculates and stores the number of deleted scan lines. The calculated number of scan lines is used in the processing of the extraction processing part 53 which will be described later (data D11).

On the other hand, when the point group is not used for creating a 3D model, the point group deleting part 52 deletes the point groups so that the point group density is determined collectively (0 may be used if the density is not used for other purposes such as landscape reproduction) (Step S25). For example, the point group deleting part 52 deletes point groups other than the target facility (for example, the walls of the house and the ground) which are unnecessary for three-dimensional modeling. When the point group deletion is finished, the point group deleting part 52 overwrites the original point group in the storage medium 47 with the thinned point group data D9 (Step S26).

The extraction processing part 53 generates a three-dimensional model using the thinned point group data overwritten on the storage medium 47 and inputs it to the GIS part 54 (three-dimensional model data D10). The GIS part 54 extracts corresponding image data from the storage medium 47 (image data D12). The GIS part 54 superimposes the three-dimensional model D10 and the image data D12 and inputs them to the information calculation part 55 (data D13). The information calculation part 55 calculates various facility information (deflection of utility poles, cable slackness, and the like).

If the point group deleting part 51 or the point group deleting part 52 deletes the point group, the following problems will occur during 3D model generation.

As shown in FIG. 1, in the technique in the related art, the point group 10a and the scan line 20a are created in the space Ar1 and the GPS time of the point after one laser scanner lap is used as a reference for creating them. The technique in the related art uses this function to estimate the GPS time of a point which will be one lap after the rotation speed of the laser scanner and seeks and connects points on the corresponding line axis 30 which are close to that time. Here, if the scan line is deleted, there will be no point having the GPS time one round later and the technique in the related art will not be able to connect.

Figure 9:
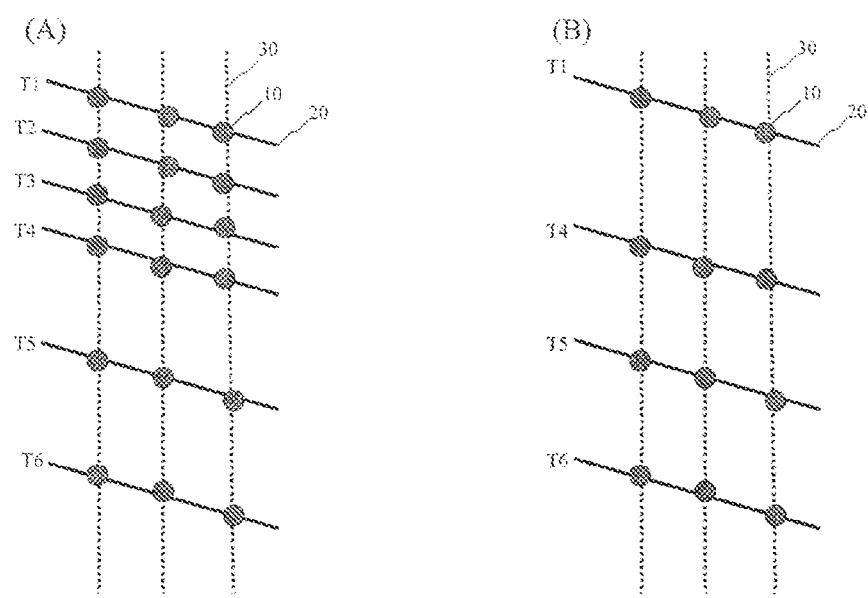
FIG. 9 is a diagram for explaining the concept of point group removal performed by the data compression device according to the present invention.

This defect will be specifically described with reference to FIG. 9. FIG. 9(A) shows the state of the point group before deletion and FIG. 9(B) shows the state of the point group after deletion. In (n is a natural number) is the GPS time and the GPS time difference is s (T (n+1)−Tn=s).

It is assumed that the scan line 20 transitions like GPS times (T1 to T6) (FIG. 9(A)). Here, it is assumed that the points at GPS times T2 and T3 are deleted (FIG. 9(B)). In the technique in the related art, the point group is retrieved for s seconds later. Thus, if the scan line 20 at time T2 after the scan line 20 at time T1 is lost, the points cannot be connected. For this reason, in the technique in the related art, only the points at times T4 to T6 are connected.

In the data compression device 50 of the present embodiment, the point group deleting part (51, 52) calculates the number of deleted scan lines and the extraction processing part 53 determines which points needs to be connected with reference to the calculated number of scan lines. For this reason, the data compression device 50 stores information regarding the number of deleted scan lines and connects the point of time of interest with the point having GPS time information after (deleted number+1) rounds. Thus, an operation is performed so that point groups with deleted GPS times are not found.

Specifically, the data compression device 50 has information that the point groups at times T2 and T3 have been deleted and understands that, after time T1, it is necessary to search for the point group at time T4. That is to say, the point group after s×(number of deleted scan lines 2+1)=3 s seconds is retrieved. For this reason, the data compression device 50 can connect the point groups at times T1 and T4 and can connect the point groups at all times T1 to T6.

Therefore, the data compression device 50 can create pseudo scan lines and point groups even after deleting the point groups and can ensure the accuracy of model creation.

Note that the data compression device 50 includes at least one of the point group deleting part 51 and the point group deleting part 52.

Embodiment 2

A data compression device 50 can also be realized by a computer and a program and the program can be recorded on a recording medium or provided over a network.

Figure 10:
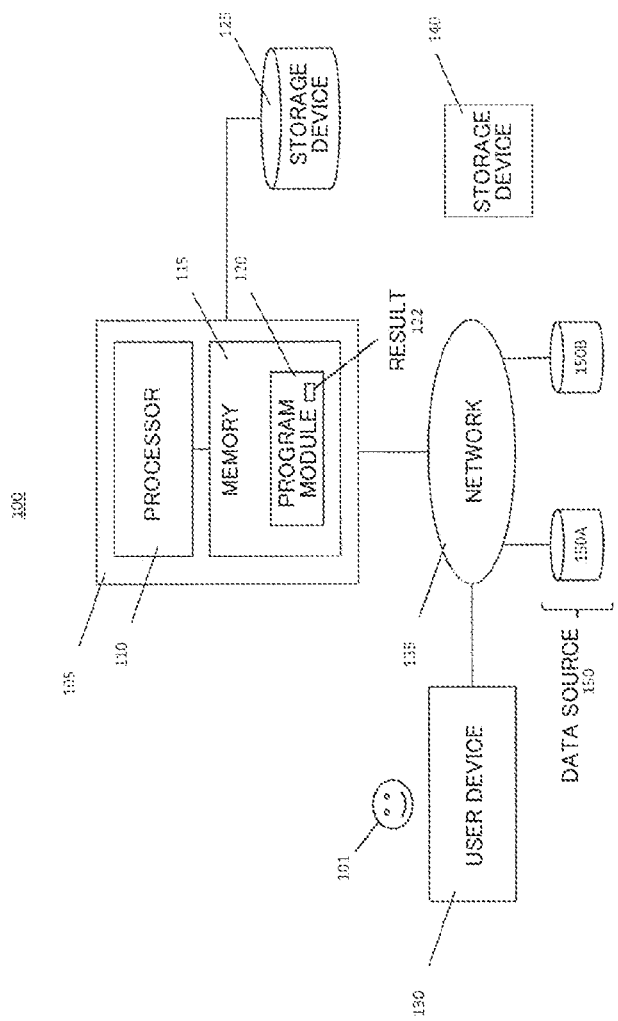
FIG. 10 is a diagram for explaining the data compression device according to the present invention.

FIG. 10 shows a block diagram of system 100. A system 100 includes a computer 105 connected to a network 135.

The network 135 is a data communication network. The network 135 may be a private network or a public network and may include any or all of (a) a personal area network covering, for example, a room, (b) a local area network covering, for example, a building, (c) a campus area network covering, for example, a campus, (d) a metropolitan area network covering, for example, a city, (e) a wide area network covering areas which connect, for example, across urban, rural or national boundaries, and (f) the Internet. The communication is performed using electronic and optical signals through the network 135.

The computer 105 includes a processor 110 and a memory 115 connected to the processor 110. Although the computer 105 is described herein as a standalone device, the computer 105 is not limited in this manner, but rather may be connected to other devices not shown in the distributed processing system.

The processor 110 is an electronic device made up of logic circuitry which responds to and executes instructions.

The memory 115 is a tangible computer-readable storage medium in which a computer program is encoded. In this regard, the memory 115 stores data and instructions or a program code readable and executable by the processor 110 to control an operation thereof. The memory 115 may be implemented in a random access memory (RAM), a hard drive, read only memory (ROM), or a combination thereof. One of the constituent elements of the memory 115 is a program module 120.

The program module 120 includes instructions for controlling the processor 110 to perform the processes described in the specification. Although the operations are described in the specification as being performed by the computer 105 or a method or process or sub-process thereof, those operations are actually performed using the processor 110.

The term "module" is used in the specification to refer to a functional operation which can be embodied either as a standalone constituent element or as an integrated composition of multiple sub-constituent elements. Accordingly, the program module 120 may be implemented as a single module or as multiple modules working in cooperation with each other. Furthermore, although the program modules 120 are described in the specification as being installed in the memory 115 and thus implemented in software, the program modules 120 can be implemented in hardware (for example, electronic circuitry), firmware, software, or a combination thereof.

The program modules 120, although shown already loaded into the memory 115, may be configured to be located on the storage device 140 for later loading into the memory 115. The storage device 140 is a tangible computer-readable storage medium which stores program modules 120. Examples of the storage device 140 include compact discs, magnetic tapes, read-only memories, optical storage media, hard drives or memory units composed of a plurality of parallel hard drives, and universal serial bus (USB) flash drives. Alternatively, the storage device 140 may be a random access memory or other type of electronic storage device located in a remote storage system (not shown) and connected to the computer 105 via a network 135.

The system 100 further includes a data source 150A and a data source 150B which are collectively referred to as a data source 150 in the specification and communicatively connected to the network 135. In practice, the data source 150 may include any number of data sources, that is, one or more of data sources. The data source 150 includes unstructured data and can include social media.

The system 100 further includes a user device 130 operated by a user 101 and connected to the computer 105 via the network 135. The user device 130 includes input devices such as a keyboard or a speech recognition sub-system for allowing the user 101 to delivery information and command selections to a processor 110. The user device 130 further includes an output device such as a display device or a printer or a speech synthesizer. A cursor control part such as a mouse, a trackball, and a touch-sensitive screen allows the user 101 to manipulate a cursor on the display device to delivery further information and command selection to the processor 110.

The processor 110 outputs the results 122 of the execution of the program module 120 to the user device 130. Alternatively, the processor 110 may provide an output to, for example, a storage 125 such as a database or a memory or to a remote device (not shown) via the network 135.

For example, the program module 120 may be a program which executes the flowchart of FIG. 6 or 8. The system 100 can be operated as the point cloud deleting part (51, 52) of the data compression device 50.

Although the term "comprising" or "including" specifies the presence of the features, integers, steps, or constituent elements referred to in the specification, it is not to be interpreted as excluding the presence of one or more other features, integers, steps, or constituent elements, or groups thereof. The terms "a" and "an" are indefinite articles and thus do not exclude embodiments having a plurality thereof.

Other Embodiments

Note that the present invention is not limited to the above-described embodiments and various modifications can be made without departing from the gist of the present invention. In short, the present invention is not limited to the high-level embodiments as they are and can be embodied by modifying the constituent elements without departing from the scope of the present invention at the implementation stage.

Moreover, various inventions can be formed by appropriately combining a plurality of constituent elements disclosed in the above embodiments. For example, some constituent elements may be omitted from all of the constituent elements shown in the embodiments. Furthermore, constituent elements across different embodiments may be combined as appropriate.

REFERENCE SIGNS LIST

42: Camera
43: GPS receiver
44: Inertial measuring part (IMU)
45: Odometer
46: Laser scanner
47: Storage medium
48: Arithmetic device
50: Data compression device
51, 52: Point group deleting part
53: Extraction processing part
54: GIS part (geographic information system)
55: Information calculation part
100: System
101: User
105: Computer
110; Processor
115: Memory
120: Program module
122: Result
125: Storage device
130: User device
135: Network
140: Storage device
150: Data source

The invention claimed is:

1. A data compression device comprising:
a point group deleting part, including one or more processors, configured to:
thin out three-dimensional (3D) point group data to remove redundancies according to an arbitrary criterion, wherein the 3D group data comprising 3D coordinates of points on a surface of an outdoor structure acquired using a 3D laser scanner while moving, and
calculate scan lines deleted through the thinning of the 3D point group data; and
an extraction processing part, including one or more processors, configured to generate a 3D model from the thinned 3D point group data by connecting (i) proximate scan lines and (ii) scan lines before and after the deleted scan lines skipped due to the redundancies.

2. The data compression device according to claim 1, wherein the arbitrary criterion of the point group deleting part is a criterion determined using a moving speed of the 3D laser scanner.

3. The data compression device according to claim 1, wherein the arbitrary criterion of the point group deleting part is a criterion determined using a type of the outdoor structure.

4. The data compression device according to claim 1, wherein the point group deleting part is configured to thin out the 3D point group data to remove redundancies using a thinning rate proportional to a velocity of a moving speed of the 3D laser scanner.

5. The data compression device according to claim 1, wherein the point group deleting part is configured to thin out the 3D point group data until a point density of the 3D point group data reaches a threshold density.

6. A method comprising:
thinning out three-dimensional (3D) point group data to remove redundancies according to an arbitrary criterion, wherein the 3D group data comprising 3D coordinates of points on a surface of an outdoor structure acquired using a 3D laser scanner while moving;
calculating scan lines deleted through the thinning of the 3D point group data; and
generating a 3D model from the thinned 3D point group data by connecting (i) proximate scan lines and (ii) scan lines before and after the deleted scan lines skipped due to the redundancies.

7. The method according to claim 6, wherein the arbitrary criterion is a criterion determined using a moving speed of the 3D laser scanner.

8. The method according to claim 6, wherein the arbitrary criterion is a criterion determined using a type of the outdoor structure.

9. A non-transitory computer-readable medium storing software comprising instructions executable by one or more computers which, upon such execution, cause the one or more computers to perform operations comprising:
thinning out three-dimensional (3D) point group data to remove redundancies according to an arbitrary criterion, wherein the 3D group data comprising 3D coordinates of points on a surface of an outdoor structure acquired using a 3D laser scanner while moving;
calculating scan lines deleted through the thinning of the 3D point group data; and
generating a 3D model from the thinned 3D point group data by connecting (i) proximate scan lines and (ii) scan lines before and after the deleted scan lines skipped due to the redundancies.

10. The non-transitory computer-readable medium according to claim 9, wherein the arbitrary criterion of the point group deleting part is a criterion determined using a moving speed of the 3D laser scanner.

11. The non-transitory computer-readable medium according to claim 9, wherein the arbitrary criterion of the point group deleting part is a criterion determined using a type of the outdoor structure.

\* \* \* \* \*